United States Patent [19]

Kinzler et al.

[11] Patent Number: 4,888,970

[45] Date of Patent: Dec. 26, 1989

[54] APPARATUS HAVING A MECHANICAL KEY AND A TRANSMITTER FOR ACTUATION OF A LOCK SYSTEM

[75] Inventors: Hans Kinzler; Aleksander Kotowicz, both of Regensburg, Fed. Rep. of Germany

[73] Assignee: Siemens Aktiengesellschaft, Berlin and Munich, Fed. Rep. of Germany

[21] Appl. No.: 110,450

[22] Filed: Oct. 20, 1987

[30] Foreign Application Priority Data

Oct. 20, 1986 [DE] Fed. Rep. of Germany ....... 3635609

[51] Int. Cl.$^4$ ............................................. E05B 19/00
[52] U.S. Cl. .................................... 70/456 R; 70/414; 70/408
[58] Field of Search ............................ 70/456 R–460, 70/413, 414, 408, 395, 256

[56] References Cited

U.S. PATENT DOCUMENTS

| 2,558,265 | 6/1951 | Mosch | 70/456 R |
|---|---|---|---|
| 2,822,684 | 2/1958 | Ray | 70/456 R |
| 2,959,084 | 11/1960 | Reuge | 70/456 R X |
| 3,023,603 | 3/1962 | Bowen | 70/456 R |
| 3,863,062 | 1/1975 | Caron | 240/6.4 X |
| 4,524,594 | 6/1985 | Bascou | 70/459 X |
| 4,574,285 | 3/1986 | Bascou | 70/456 R |
| 4,660,397 | 4/1987 | Girimont | 70/456 B X |

FOREIGN PATENT DOCUMENTS

| 2558696 | 1/1984 | France . | |
|---|---|---|---|
| 597276 | 8/1959 | Italy | 70/456 R |
| 2039321 | 8/1980 | United Kingdom | 70/408 |
| 2155988 | 10/1985 | United Kingdom | 70/395 |

Primary Examiner—Gary L. Smith
Assistant Examiner—Suzanne L. Dino
Attorney, Agent, or Firm—Hill, Van Santen, Steadman & Simpson

[57] ABSTRACT

A key unit includes a transmitter for remote actuation of a lock and, in a common housing, a mechanical key for mechanical operation of the lock. The mechanical key is held within a key compartment in the housing and, when a trigger button is depressed, pivots to an outwardly extending working position on a circular bearing portion. The cover of the housing is held to the lower portion at one location by a bayonet connection which enables the cover to be pivoted to a position for access to the battery compartment in which batteries are contained for the transmitter. A lock connection spaced from the bayonet connection couples the cover to the lower housing portion when closed, and a removable locking screw is provided to hold the cover in the closed position.

9 Claims, 8 Drawing Sheets

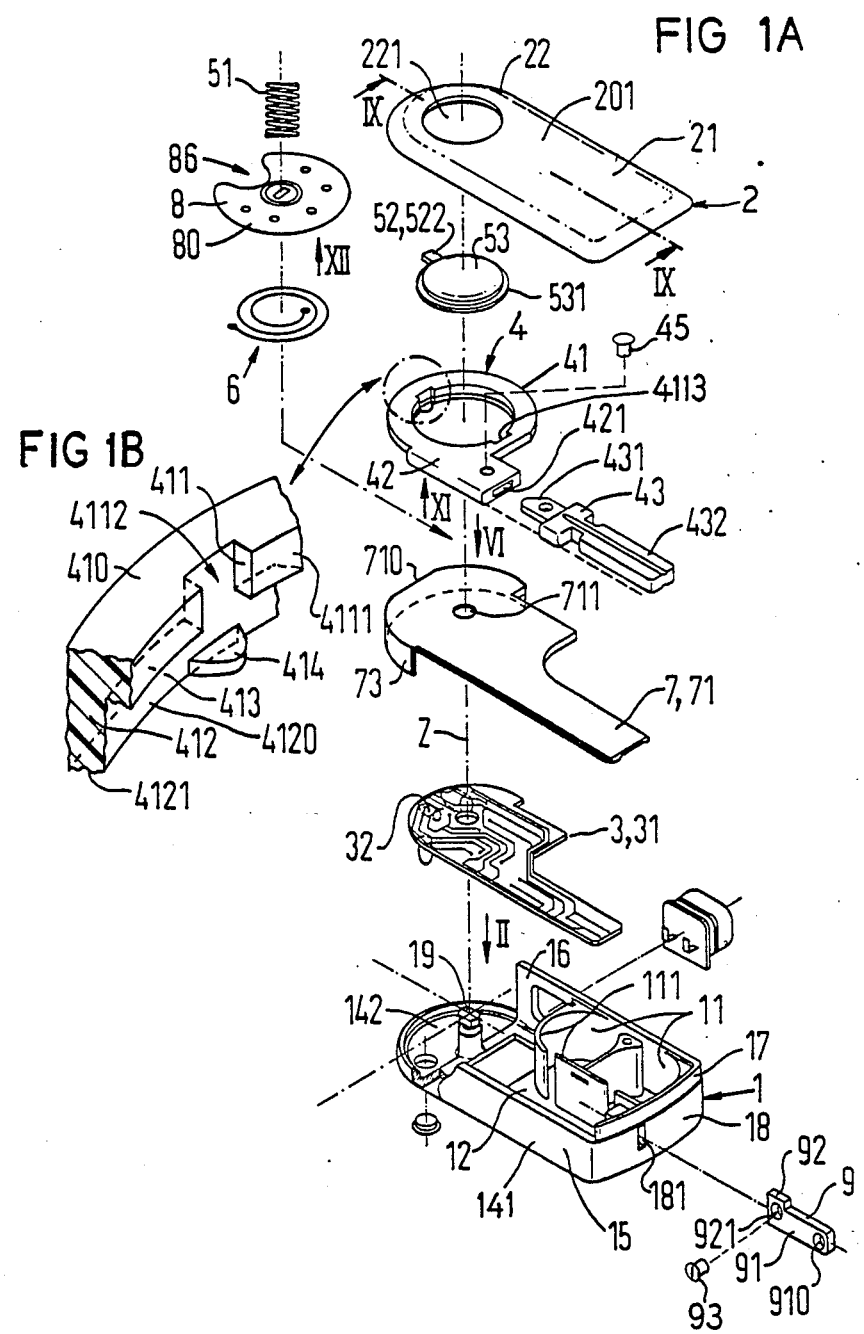

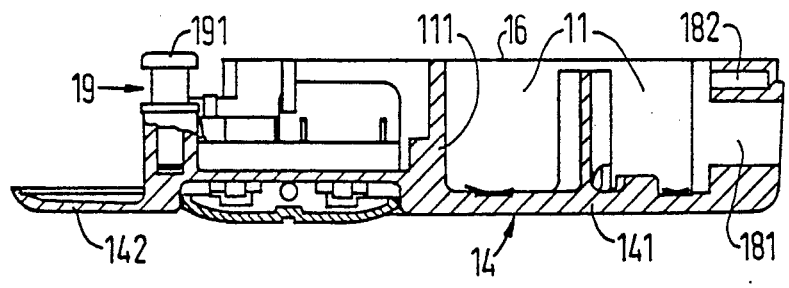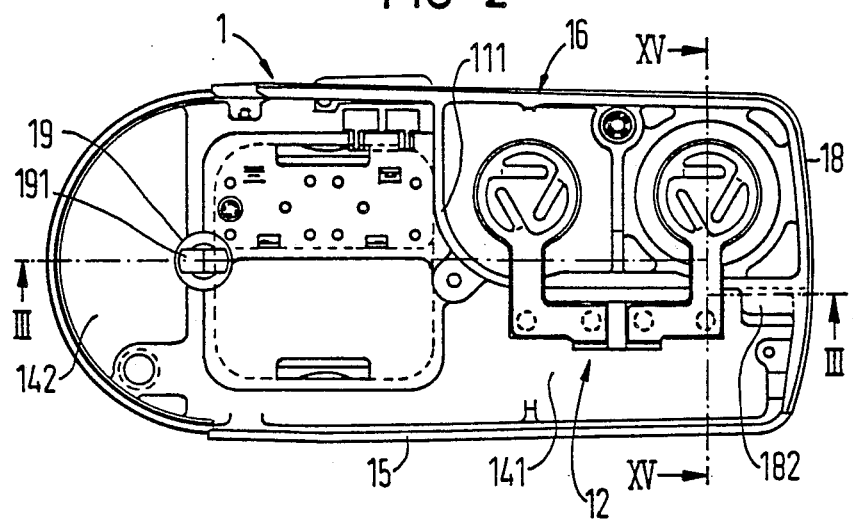

FIG. 7
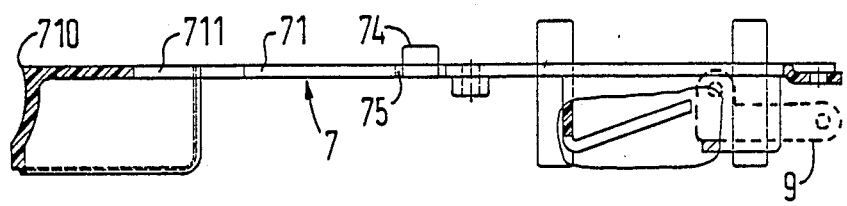
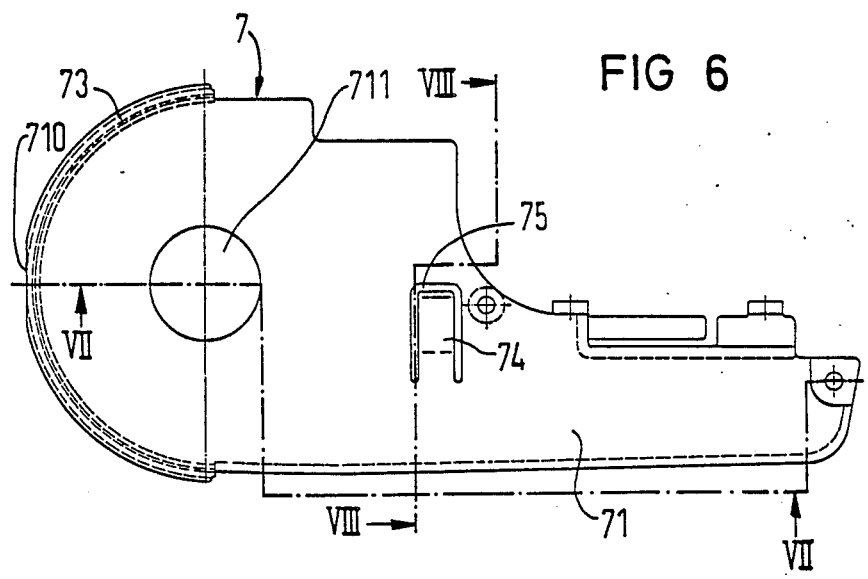
FIG 6
FIG 8
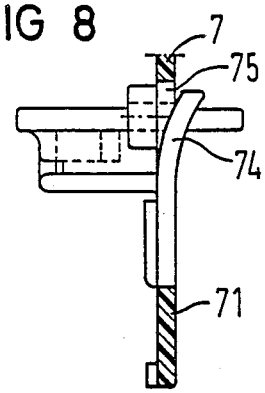

4,888,970

APPARATUS HAVING A MECHANICAL KEY AND A TRANSMITTER FOR ACTUATION OF A LOCK SYSTEM

BACKGROUND OF THE INVENTION

1. Field of the Invention

The present invention relates to a key unit including a mechanical key in a common housing with a transmitter for remotely controlling a lock system.

2. Description of the Related Art

A key case with a retractable key in a housing is disclosed in French Pat. No. 25 58 696. There is no disclosure regarding the accommodation of replaceable batteries in this patent.

European patent application No. 0 088 699 discloses a housing having a mechanical key, a transmitter and batteries disposed within the housing. The key is a cylindrical bolt that is rotatable about its longitudinal axis in the housing.

SUMMARY OF THE INVENTION

An object of the present invention is to provide a compact housing containing a transmitter for remote opening of a lock system as well as containing a mechanical key with a circular bearing portion and an eccentric blade for manual operation of the lock system. A further object of the invention is to provide simple access to a battery compartment in a transmitter housing.

These and other objects are achieved in a key unit in which a mechanical key is provided in a housing having a lower part and a flat cover, a battery compartment being provided in the lower part and the cover being pivotable relative to the lower part for access of the battery compartment. The device of the present invention enables the key, a transmitter and batteries to be accommodated in one housing having a length and width essentially determined by the dimensions of the key and a height essentially determined by the overall height of a battery.

An advantageous development of the invention is to provide the key with a bearing member in the form of a circular ring and to accommodate a locking means for holding the key in place, as well as a drive for selectively moving the key into a working position within the circular ring.

According to an especially advantageous embodiment of the invention, a blade of the key is detachably connected to the bearing member so that it is simple to pre-fabricate the key units and to subsequently provide them with an appertaining key blade. It is, of course, also possible to subsequently provide the units with corresponding codes for the transmitters, as well.

Further advantages of the invention are realized by providing a bayonet connection between the lower housing part and the cover and by providing a lock connection spaced from the bayonet connection to also connect the two housing parts. A trigger button extends through an opening in the cover. The trigger button is biased and includes catches to hold the key in a normal, or closed, position and a spring to bias the key into the working, or open, position.

BRIEF DESCRIPTION OF THE DRAWINGS

FIG. 1A is an exploded view of the apparatus of the present invention shown approximately life size;

FIG. 1B is an enlarged fragmentary view of a portion of the bearing ring of FIG. 1;

FIG. 2 is a plan view of a lower portion of a housing of the invention shown in the direction of the arrow II in FIG. 1;

FIG. 3 is a cross section along line III—III of FIG. 2 through the lower housing portion;

FIG. 6 is a plan view of a partition portion of the present apparatus viewed in the direction of the arrow VI in FIG. 1;

FIG. 7 is a cross section along line VII—VII of FIG. 6 showing the partition portion;

FIG. 8 is a partial cross-section along line VIII—VIII of FIG. 6 showing a block spring in the partition portion;

DESCRIPTION OF THE PREFERRED EMBODIMENTS

Figure 4:
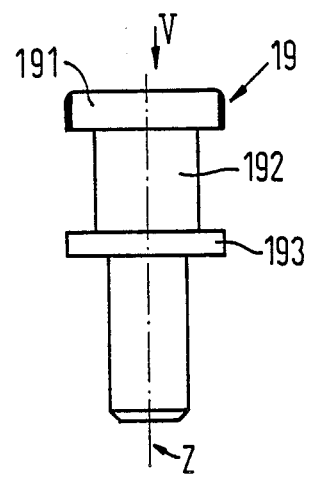
FIG. 4 is a side elevational view of a coupling pin from the apparatus of the present invention.

An exemplary embodiment of a key unit of the invention is shown in an exploded view in FIG. 1A including a housing composed of a lower housing part 1 and a housing cover 2. The lower housing part 1 has a roughly rectangular main portion 141 and a semicircular shaped end portion 142, while the cover 2 also has a generally rectangular main portion 21 and a semicircular end piece 22.

A key 4 is held at the inside of the cover 2 and includes a bearing ring portion 41 with a projection 42 arranged eccentrically relative to a central axis Z and roughly tangentially relative to the bearing ring 41. An acceptance slot 421 is formed in the projection 42. A blade 43 of a key 4 includes a shank or beard 432 and a coupling piece 431 which is detachably secured to the bearing ring 41. The blade 43 has the coupling piece 431 plugged into the acceptance slot 421 where it is secured by a screw or rivet 45 extending through a pair of openings in registration.

The bearing ring portion 41 of the key has an essentially L-shaped cross section, as can be seen by reference to the enlarged fragmentary view of FIG. 1B. The bearing ring 41 has a guide leg or flange 411 and a cross leg 412 roughly at a right angle thereto. The guide leg 411 has a fixing notch 4112 and a position notch 4113 lying diametrically opposite one another. A catch stop 414 extends from an inside surface 4120 of the cross leg 412 in the region of each of the notches 4112 and 4113 and at a distance from the guide leg or flange 411. The catch stop 414 limits the extent of axial play in a catch mechanism which engages into one of the notches 4112 and 4113 and which is pressed out of a respective one of the notches 4112 and 4113 against the catch stop 414 for releasing the key 4.

Figure 9:
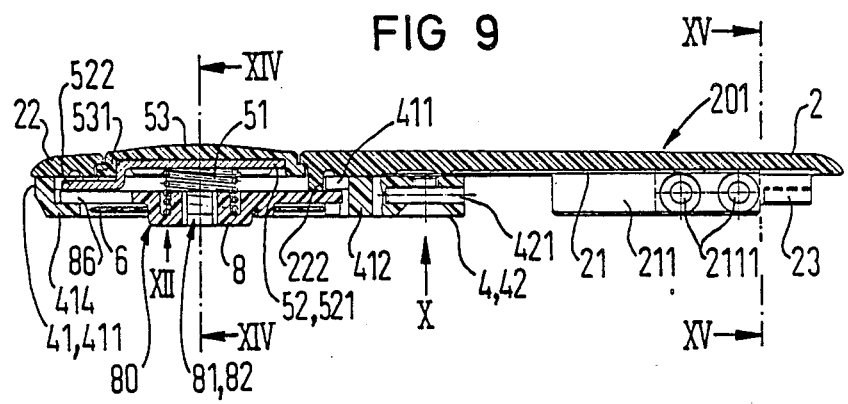
FIG. 9 is a longitudinal cross section through the cover along line IX—IX of FIG. 1 and of FIG. 10.
Figure 14:
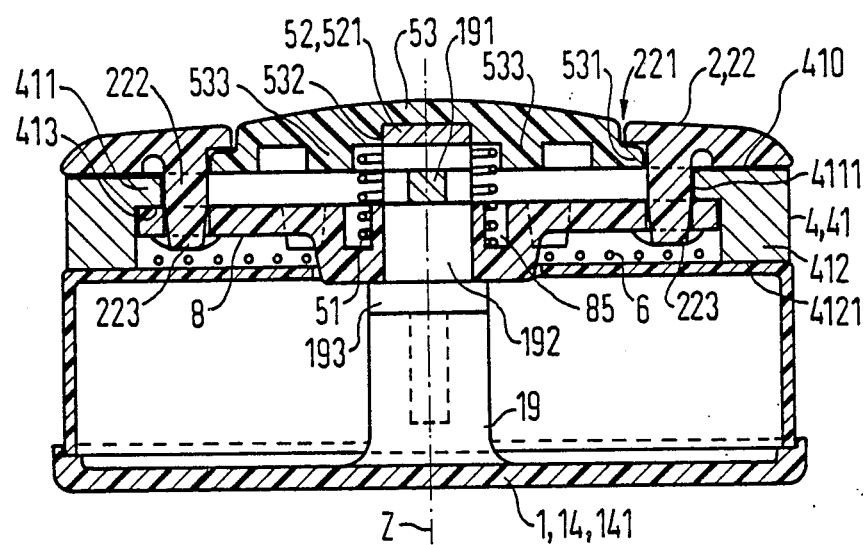
FIG. 14 is a cross section along line XIV—XIV of FIGS. 9 and 10 showing the assembled housing along a central axis Z.

The cover 2 has a circular opening 221, half of which lies in the semicircular end piece 22 and the other half of which lies in the main member 21. The opening 221 is arranged coaxially with the center axis Z. Referring to FIGS. 9 and 14, the cover 2 has a circular bearing piece 222 extending from an inside surface coaxially with the central axis Z. The bearing ring 41 of the key 4 is guided on the bearing piece 222 so that an inside edge 4111 of the guide leg or flange 411 presses against the outside surface of the bearing piece 222. In other words, the bearing ring 41 of the key is mounted to encircle the bearing piece 222 of the cover 2.

Figure 10:
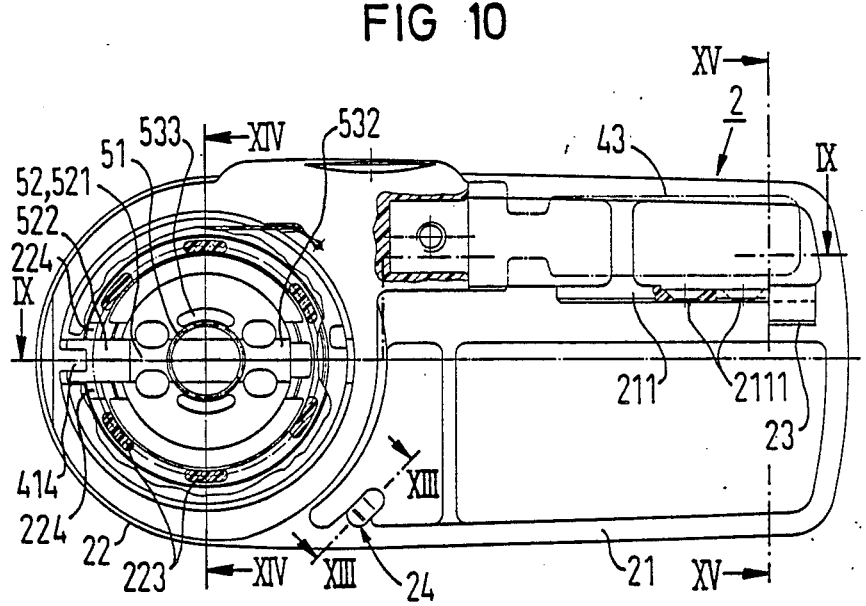
FIG. 10 is a bottom plan view of the cover of FIG. 9 viewed in the direction of the arrow X.

The bearing ring 41 has an outside surface 410 shown in FIG. 14 lying against the cover 2. The key 4 is held in this position by a circular bearing disk 8 which is also arranged coaxially with the central axis Z and which is encircled by the cross leg 412 of the bearing ring 41. An outwardly disposed edge region of the bearing disk 8 lies on a bearing surface 413 of the guide leg or flange 411. The bearing disk 8 is connected to the cover by pins 223 as shown in FIGS. 10 and 14 which extend from the bearing piece 222 through pin holes 83 (see FIG. 12) in the bearing disk 8. The ends of the pins 223 are riveted or flattened over to hold the bearing disk 8 in place. Thus, the bearing ring 41 of the key 4 is rotatably guided between the inside of the cover 2 and the bearing disk 8.

A circular trigger button 53 shown in FIGS. 1, 9 and 14 is arranged in the cover opening 221. The trigger button 53 has an edge 531 pressing against a lip at the inside of the cover 2, as can be seen by FIG. 14. The trigger 53 is in the form of a depressable button which is held in position and biased against the cover 2 by a compression spring 51 that is supported at one end in an annular channel 85 of the bearing disk 8 and at the other end against the inside surface of the trigger 53. Semicircular guide ribs 533 guide and hold the compression spring 51 centered in the trigger 53.

Figure 11:
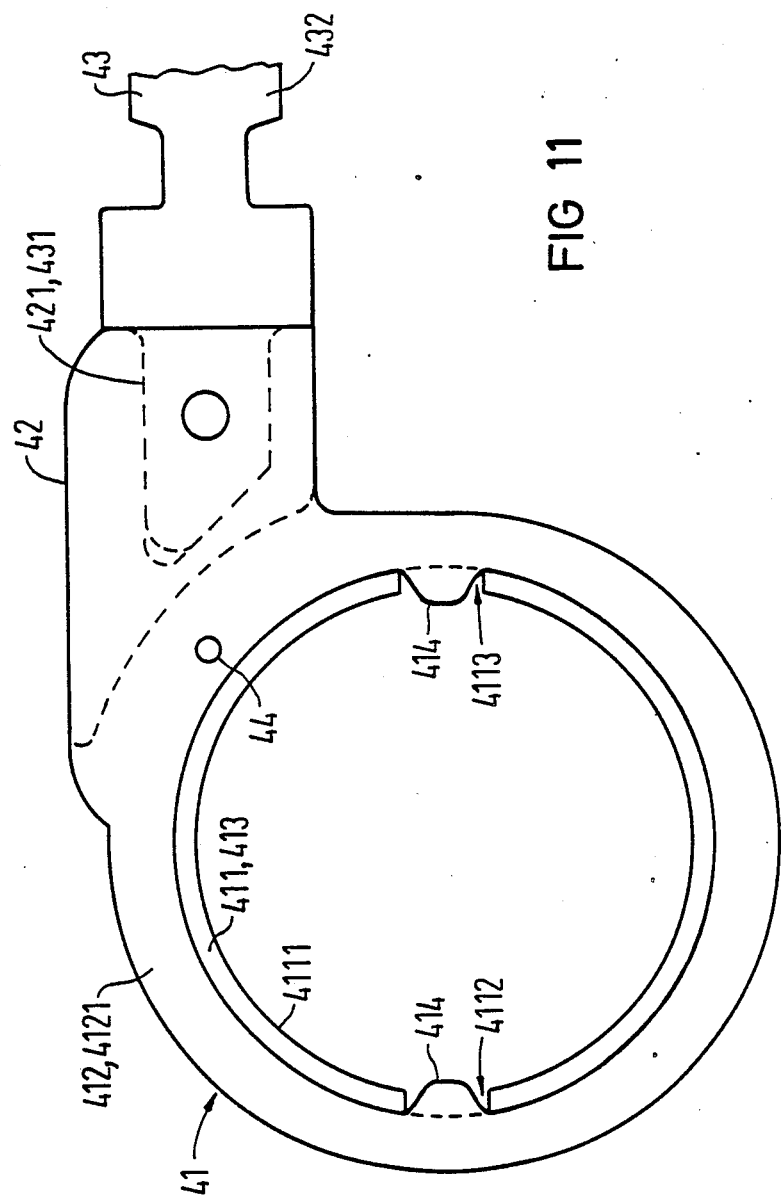
FIG. 11 is an enlarged plan view of a bearing ring portion of a key of the invention.

A catch mechanism 52 extends from the trigger button 53 in FIG. 1 angles shown in FIGS. 9, 10 and 14, includes a catch leg 521 extending diametrically through the central axis Z at the inside of the trigger 53 in a channel 532. An extension of the catch leg 521 is formed by a catch tab 522 which extends beyond the edge of the trigger 53, and which engages into a fixing notch 4112 of the bearing ring portion 41 of the key when the trigger 53 is in the position illustrated in the Figures. The key 4 is retained in the fixed or closed position shown in broken outline in FIG. 10 by the catch tab 522 extending into the fixing notch 4112. It is biased to an open or working position by a helical spring 6 which has a first end secured to a retaining pin 84 at an upper side 80 of the bearing disk 8 (FIG. 12) and a second end secured to a fastening pin 44 on the bearing ring 41 (FIG. 11).

Figure 12:
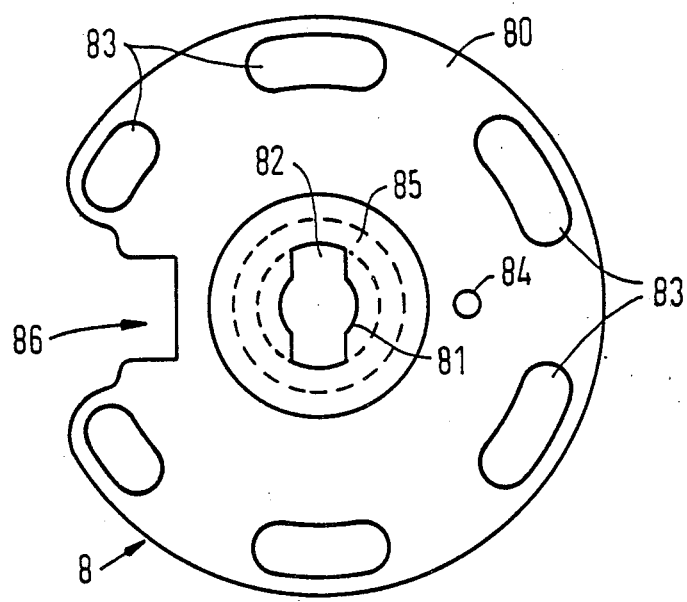
FIG. 12 is a plan view of a bearing disk shown in the direction of the arrow XII in FIG. 1.

When the trigger 53 is pressed into the housing against the force of the compression spring 51, the catch tab 522 of the catch mechanism 52 is guided by two guide posts 224 of the bearing member 222 to extend into a recess 86 in the bearing disk 8 as shown in FIGS. 9 and 12. The catch tab 522 moves in an axial direction until it strikes against the catch stop 414 of the bearing ring 41 shown in FIG. 1B. The helical spring 6 then rotates the key 4 by approximately 180 degrees so that the key 4 moves from the illustrated fixed position to a working position in which the catch leg 421 snaps into the working position notch 4113 of the bearing ring 41. Thus, the position of the key 4 is fixed relative to the housing in the working position.

The key 4 is manually turned back into the housing against the force of the helical spring 6 by first depressing the trigger 53 so that the catch tab 522 moves out of the position notch 4113 and then rotating the key 4 back into the housing. In the locked position in the housing, the catch tab 522 snaps back into the fixing notch 4112 in the bearing ring 41 and holds the key 4 in the fixed position shown in the figures.

With reference particularly to FIG. 10, the width of the housing is essentially determined only by the diameter of the bearing ring 41 and the length of the housing is essentially determined by the length of the blade 43 of the key 4. As a result of the eccentric arrangement of the blade 43 relative to the bearing ring 41, a free space is available next to the blade 43. This free space is separated from the blade 43 as can be seen in FIG. 10 by a partition 211 extending from the inside surface of the cover 2. The partition 211 can also be seen in FIG. 15.

Figure 15:
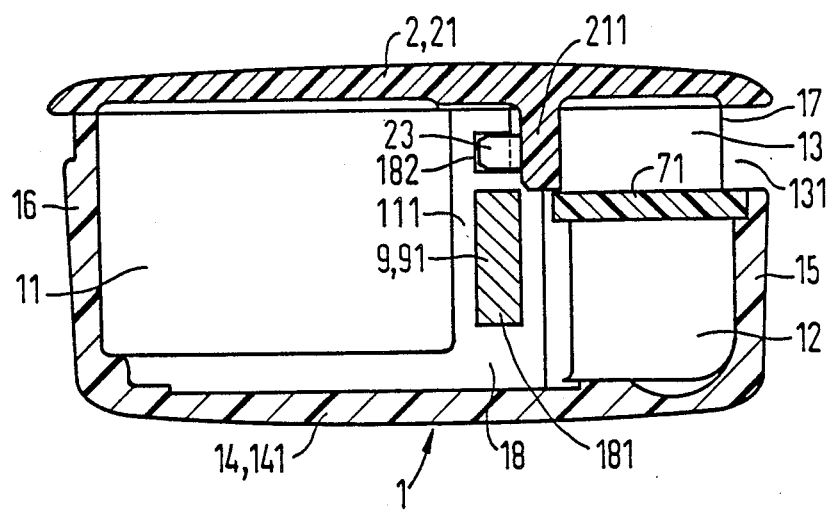
FIG. 15 is a cross-section along line XV—XV of FIGS. 2, 9 and 10 showing the assembled housing.

The main member 141 of the lower housing portion 1, as best seen in FIG. 1A, is bounded by a side wall 15, a back wall 18, and by a longitudinal wall 16 which extend perpendicular to a floor 14. The back wall 18 and the longitudinal wall 16 are higher then the side wall 15 by the width of an edge strip 17. As a result of the edge strip 17 on the longitudinal wall 16 and the back wall 18, a key compartment access slot 131 shown in FIG. 15 is formed in the side wall 15 between the cover 2 and the lower part 1 for access to a key compartment 13. The blade 43 of the key 4 is in the key compartment 13 when in the fixed or closed position. The inside of the key compartment 13 is bounded by the partition 211 of the cover 2. A battery compartment 11 lies at the other side of the partition 211, the battery compartment 11 being bounded by compartment walls 111 as shown in FIGS. 1A and 15 extending from the floor 14 of the lower portion 1 up to the cover 2.

A transmitter 3 is provided on both sides of a printed circuit board 31 and the printed circuit board 31 is accommodated in an electronics compartment 12 under the key compartment 13. Electronics compartment 12 is covered by a partition 7 shown generally in FIG. 1A and in more detail in FIGS. 6 and 7. The partition 7 has an intermediate plate 71 which lies parallel to the floor 14 and has a roughly semicircular curved wall 73 projecting from the intermediate plate 71 in the region of the semicircular end piece 142 of the lower housing portion 1. The curved wall 73 serves as a portion of the outer housing surface. The curved wall 73 is formed of plastic which is transmissive for infrared radiation, for example. A reticle 710 is formed in the curved wall 73 roughly in the center of the semicircular wall. The reticle 710 is an indentation or a departure from the circular form, the shape of which can be sensed in the dark to enable the transmitter to be aligned with a receiver. A transmission diode 32 which forms a portion of the transmitter 3 is accommodated behind the reticle 710.

Figure 5:
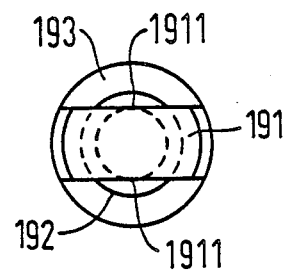
FIG. 5 is a plan view of the coupling pin viewed in the direction of the arrow IV of FIG. 4.

The cover 2 with the key 4 fastened thereto is secured to the lower housing portion 1, which includes the transmitter 3 and the partition 7, by a bayonet connection and by a bolt connection spaced at a distance therefrom. The bayonet connection includes a coupling pin 19 shown in FIGS. 4 and 5 including a shaft 192 between a bearing edge 193 and a hammer head 191 with flattened sides 1911. The coupling pin 19 extends coaxially relative to the central axis Z at a right angle from the floor 14 of the lower housing portion 1 as can be seen by FIGS. 1A, 3 and 14, with the flattened sides 1911 extending parallel to the side wall 15. The pin 19 also extends through a plate bore 711 in the partition 7. The bearing plate 8 shown in FIG. 12 has a bearing hole 81 with a bayonet slot 82 allocated to it for the coupling pin 19. The bayonet slot 82 through which the hammer head 191 fits extends transversely relative to the elongated sides 1911 of the hammer head 191. The bearing hole 81 has a diameter which coincides with the diameter of the shaft 192 of the coupling pin 19.

Turning now to FIG. 15, the bolt connection which is spaced from the bayonet connection includes a lock pocket 182 at the inside of the back wall 18 of the lower housing portion 1, and a lock 23 extending thereinto at the partition 211 of the cover 2 and parallel to the cover 2.

During assembly, the cover 2 with the attached key 4 is turned by approximately 90 degrees relative to the lower portion 1. In this position, the hammer head portion 191 of the coupling pin 19 is plugged through the bayonet slot 82 of the bearing disk 8 on the cover 2, and the cover 2 is turned by 90 degrees relative to the lower portion until the two parts coincide in their final position as shown in FIG. 15. In the final position, the hammer head 191 extends transversely to the bayonet slot 82 in the bearing disk and the lock 23 engages into the lock pocket 182. The two parts of the housing are thus coupled to one another at two locations at a distance from one another.

The final position is secured by a locking screw 93 which is accessible from the outside of the housing through the key compartment 13 and which extends through the partition 211 of the cover 2 into a threaded bore 921 in a bore leg 92 of an eyelet angle (FIG. 1). The eyelet angle 9 is guided and held in the compartment wall 111 and a backwall slot 181 of the lower portion 1. It has an eyelet leg 91 with an eyelet or opening 910 at 110. The eyelet angle 9 is fastenable at two different positions. To this end, the partition wall 211 of the cover 2 shown in FIGS. 9 and 10 has two fastening bores 2111 adjacent one another. When the locking screw 93 is mounted through the threaded bore 921 and into the left most one of the fastening bores 2111, the eyelet angle 9 is disposed completely within the housing. On the other hand, when the locking screw 93 is mounted though the threaded bore 921 and into the right most one of the fastening bores 2111, the eyelet opening 910 extends from the housing. In this case the eyelet 910 provides a convenient attachment for a key ring or the like.

Figure 13:
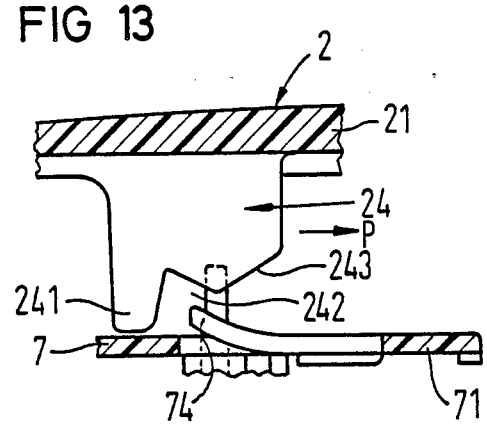
FIG. 13 is a cross section along line XIII—XIII of FIG. 10 showing a turning block detent of the cover and the blocking spring of the partition portion in block position.

The battery compartment 11, which is shown in FIG. 2 with battery contacts, must be accessible for changing the batteries. To this end, the two portions of the housing are rotatable relative to one another into a locking position after the locking screw 93 has been released. A turning block is provided to ensure that the two portions do not rotate so far relative to one another that the bayonet connection releases the cover 2 from the lower portion 1. The turning block includes a fixing stop 24 projecting approximately perpendicularly from the inside of the cover 2 as shown in FIG. 10. A side view of the fixing stop 24 is seen in FIG. 13 including a stop pin 241, a sloped ramp 243, and a depression 242 formed therebetween.

The partition plate 71 shown in FIGS. 6 and 7 includes a fixing pin 74 that is shown in greater detail in FIG. 8. The fixing spring 74 is opposite the fixing stop 24 as can be seen in FIG. 13 when the cover 2 and lower part 1 are in the appropriate relative positions. During opening of the housing, the cover 2 is moved in the direction of the arrow P relative to the partition 7 in the lower portion 1 until the fixing spring 74 strikes against the stop pin 241. In this position, the bayonet connection is still fully effective to hold the housing portions together, but the battery compartment 11 is accessible for replacing the batteries. Once the batteries are replaced, the housing portions are returned to their normal positions and the locking screw 93 is put into place to fasten the upper and lower housing portions securely together.

For complete disassembly of the two housing portions, once the cover 2 is pivoted to the battery access position the fixing spring 74 is pressed into a corresponding recess 75 in the partition 71, for example, with a screwdriver. To facilitate this, the ramp 243 serves as an aid to the introduction of the screwdriver and the limitation of the depression 242 serves as an abutment. The housing portion can then be rotated relative to one another to release the bayonet connection.

Although other modifications and changes may be suggested by those skilled in the art, it is the intention of the inventors to embody within the patent warranted hereon all changes and modifications as reasonably and properly come within the scope of their contribution to the art.

We claim:

1. A lock unit, comprising:
   a mechanical key having a circular bearing portion and a blade extending eccentrically from said bearing portion, said circular bearing portion being coaxial with a central axis;
   a transmitter for generating a modulated transmission signal for remotely controlling a lock system equipped with a receiver;
   a common housing for said key and said transmitter, said housing formed of a lower part and a flat cover, said key being rotatably seated in said flat cover;
   a circular bearing member in said housing on which said circular bearing portion of said key is rotatably seated about said central axis so that a blade of said key is pivotable between a working position extending from said housing and a fixed position in a key compartment of said housing;
   a battery compartment provided in said lower part of said housing next to and parallel to said key compartment; and
   means for pivoting said lower part relative to said cover about said central axis to provide access to at least said battery compartment in one position.

2. A lock unit as claimed in claim 1, wherein said housing has a width substantially identical to a diameter of said circular bearing portion of said key, said housing having a length substantially identical to a length of said key, and said housing having a height substantially identical to a height of said battery compartment.

3. A lock unit as claimed in claim 1, wherein said bearing portion of said key is a bearing ring,
   said blade of said key extends generally tangentially relative to said bearing ring, and a coupling member detachably connecting said blade to said bearing ring.

4. A lock unit as claimed in claim 1, further comprising:
 a bayonet connection coupling said lower part to said cover of said housing, said bayonet connection disposed coaxially with said central axis and including a coupling pin with a hammer head, means defining a bearing hole in one of said cover and said lower part, said bearing hole being mated with said coupling pin and having a bayonet slot; and
 a lock connection coupling said lower part to said cover of said housing, said lock connection being spaced, from said bayonet connection and including a lock pocket and a lock.

5. A lock unit, comprising:
 a mechanical key having a circular bearing portion and a blade extending eccentrically from said bearing portion;
 a transmitter for generating a modulated transmission signal for remotely controlling a lock system equipped with a receiver;
 a common housing for said key and said transmitter, said housing formed of a lower part and a flat cover, said key being rotatably seated about a central axis so that a blade of said key is pivotable between a working position extending from said housing and a fixed position in a key compartment of said housing;
 a battery compartment provided in said lower part of said housing next to and parallel to said key compartment;
 means for pivoting said lower part relative to said cover to provide access to at least said battery compartment in one position;
 a bayonet connection coupling said lower part to said cover of said housing, said bayonet connection disposed coaxially with said central axis and including:
  a coupling pin with a hammer head,
  means defining a bearing hole in one of said cover and said lower part, said bearing hole being mated with said coupling pin and having a bayonet slot;
 a lock connection coupling said lower part to said cover of said housing, said lock connection being spaced from said bayonet connection and including a lock pocket and a lock; and
 a turning stop provided between said lower part and said cover of said housing, said turning stop limiting rotation of said lower part relative to said cover of said housing about said central axis to prevent release of said bayonet connection but permit access to said battery compartment.

6. A lock unit as claimed in claim 4, further comprising:
 a circular ring inside said cover as a bearing member for said key; and
 a resilient button disposed within said circular ring and accessible for pressing through an opening in said cover to form a trigger.

7. A lock unit as claimed in claim 6, wherein said bearing portion of said key is a bearing ring, and further comprising:
 a bearing disk connected to said cover by pins and capturing said bearing ring of said key between said cover and said bearing disk, said bearing disk having a central bearing hole and a bayonet slot of said bayonet connection, an annular groove in said bearing disk coaxial of said central bearing hole, said groove being in side of said bearing disk facing said cover; and
 a compression spring in said annular groove of said bearing disk pressing a stop edge of said resilient button forming a trigger against an inner side of said cover.

8. A lock unit, comprising:
 a mechanical key having a circular bearing portion and a blade extending eccentrically from said bearing portion;
 a transmitter for generation a modulated transmission signal for remotely controlling a lock system equipped with a receiver;
 a common housing for said key and said transmitter, said housing formed of a lower part and a flat cover, said key being rotatably seated in said flat cover;
 a circular bearing member in said housing on which said circular bearing portion of said key is rotatably seated about a central axis so that a blade of said key is pivotable between a working position extending from said housing and a fixed position in a key compartment of said housing;
 a battery compartment provided in said lower part of said housing next to and parallel to said key compartment;
 means for pivoting said lower part relative to said cover to provide access to at least said battery compartment in one position;
 a bayonet connection coupling said lower part to said cover of said housing, said bayonet connection disposed coaxially with said central axis and including:
  a coupling pin with a hammer head,
  means defining a bearing hole in one of said cover and said lower part, said bearing hole being mated with said coupling pin and having a bayonet slot;
 a lock connection coupling said lower part to said cover of said housing, said lock connection being spaced from said bayonet connection and including a lock pocket and a lock;
 a circular ring inside said cover as a bearing member for said key;
 a resilient button disposed within said circular ring and accessible for pressing through an opening in said cover to form a trigger;
 said bearing portion of said key being a bearing ring,
 a bearing disk connected to said cover by pins and capturing said bearing ring of said key between said cover and said bearing disk, said bearing disk having a central bearing hole and a bayonet slot of said bayonet connection, an annular groove in said bearing disk coaxial of said central bearing hole, said groove being in a side of said bearing disk facing said cover;
 a compression spring in said annular groove of said bearing disk pressing a stop edge of said resilient button forming a trigger against an inner side of said cover;
 a helical spring biasing said bearing ring of said key into a working position;
 a guide leg extending radially inward from said bearing ring and surrounding said bearing member;
 a fixing notch in said guide leg;

a catch stop under said fixing notch on said bearing ring; and a catch mechanism on said trigger and having a catch leg and a catch tab, said catch mechanism engaging into said fixing notch of said key in a normal position secured by said compression spring, said catch mechanism being movable from said normal position to a release position against the force of said compression spring.

9. A lock unit as claimed in claim 8, wherein said guide leg has a position notch diametrically opposite said fixing notch to lock said key in a working position.

* * * * *